(12) United States Patent
Ducharme et al.

(10) Patent No.: US 9,495,393 B2
(45) Date of Patent: Nov. 15, 2016

(54) SYSTEM AND METHOD FOR REVIEWING ROLE DEFINITIONS

(75) Inventors: James Ducharme, Somersworth, NH (US); Michael Sean Miller, Waterloo (CA); Christopher Clifton McLaren, Cambridge (CA); Dan Uwe Zehme, Medfield, MA (US); Deepak Taneja, Wayland, MA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

(21) Appl. No.: 13/316,946

(22) Filed: Dec. 12, 2011

(65) Prior Publication Data

US 2013/0031070 A1    Jan. 31, 2013

Related U.S. Application Data

(60) Provisional application No. 61/512,173, filed on Jul. 27, 2011.

(51) Int. Cl.
*G06F 17/30* (2006.01)
(52) U.S. Cl.
CPC .............................. *G06F 17/30289* (2013.01)
(58) Field of Classification Search
CPC ............. G06F 17/30067; G06F 21/62; G06F 21/6218; G06F 21/604; G06F 17/30091; G06F 17/30289
USPC .................................................. 707/705, 781
See application file for complete search history.

(56) References Cited

U.S. PATENT DOCUMENTS

| 6,055,637 | A | * | 4/2000 | Hudson et al. ................. 726/20 |
|---|---|---|---|---|
| 6,223,985 | B1 | | 5/2001 | DeLude |
| 6,275,825 | B1 | | 8/2001 | Kobayashi et al. |
| 7,627,900 | B1 | | 12/2009 | Noel et al. |
| 7,757,277 | B2 | | 7/2010 | Haugh |
| 8,086,635 | B1 | * | 12/2011 | Rinker ......................... 707/783 |
| 8,327,457 | B1 | * | 12/2012 | Ferrara et al. .................. 726/27 |
| 2005/0138419 | A1 | * | 6/2005 | Gupta et al. .................. 713/201 |
| 2006/0136495 | A1 | * | 6/2006 | Schaad ...................... 707/104.1 |
| 2008/0034402 | A1 | * | 2/2008 | Botz et al. ......................... 726/1 |
| 2008/0052102 | A1 | * | 2/2008 | Taneja et al. ..................... 705/1 |
| 2008/0072290 | A1 | | 3/2008 | Metzer et al. |
| 2008/0120302 | A1 | | 5/2008 | Thompson et al. |

(Continued)

OTHER PUBLICATIONS

Hitachi ID Systems. "Hitachi ID Access Certifier: Periodic review and cleanup of security entitlements" [online]. Hitachi ID Systems, Jun. 7, 2011 [retrieved on Aug. 20, 2012]. Retrieved from the Internet: <URL: http://web.archive.org/web/20110607144527/http://hitachi-id.com/access-certifier/>.*

(Continued)

*Primary Examiner* — Boris Gorney
*Assistant Examiner* — Kris Andersen
(74) *Attorney, Agent, or Firm* — BainwoodHuang

(57) ABSTRACT

A system for reviewing role definitions includes a database that stores a plurality of roles. Each of the plurality of roles associates an identifier with at least one entitlement. The system also includes a second database that stores role review definitions. The review definitions define role review processes for the plurality of roles. The system further includes a processor that is in communication with the role database and the review definition database. The processor executes the role review processes defined by the review definitions at the appropriate times.

26 Claims, 19 Drawing Sheets

(56) References Cited

U.S. PATENT DOCUMENTS

| | | |
|---|---|---|
| 2008/0168530 A1 | 7/2008 | Kuehr-McLaren et al. |
| 2008/0307498 A1 | 12/2008 | Johnson et al. |
| 2009/0271863 A1 | 10/2009 | Govindavajhala et al. |
| 2009/0288150 A1 | 11/2009 | Toomim et al. |
| 2010/0162350 A1 | 6/2010 | Jeong et al. |
| 2011/0004927 A1 | 1/2011 | Zlowodzki |
| 2012/0110670 A1 | 5/2012 | Mont et al. |
| 2012/0278117 A1* | 11/2012 | Nguyen .......... G06Q 10/06 705/7.15 |

OTHER PUBLICATIONS

Bauer et al., "Real Life Challenges in Access-Control Management," CHI 2009, 10 pages.

Sandhu et al., "Role-Based Access Control Models," Computer, Date of Publication: Feb. 1996, vol. 29, Issue: 2, pp. 38-47.

* cited by examiner

300

---

Return to Review Definition: Role Structure for Engineering
 Edit Review Definition: Role Structure Review For Engineering Review Description Review Definition Name: Coarse Role Structure for Engineering 305

Description: This review is used to regularly check accuracy of the role definitions and structure for roles owned by the engineering organization. 310

Control URL: http://mycorp.com/compliance/RSR-ENG-1 315

Control Description: The description for the control goes here 320

Review Instructions: When you are performing the review, you will see these instructions on the screen. 325

Owner: AveksaAdmin 330

Item Type To Review: Role Definition 301

Duration of Reviews: 2 Weeks 335

Available Rule Actions: Yes 340

Generate Change Request: X Automatically _ Explicit by Owner 345

Default Review State: X Active _ Hold 350

Schedule 355

Scheduled: X Yes _ No
       Start: _ Now X Date 05/10/2011 00:45:00
    Frequency: _ Dailey _ Weekly _ Monthly _ Quarterly _ Semi-Annualy _ Annually _ Once < Back    Next>    Cancel    Help

```
Return to Review Definition: Role Structure for Engineering
 Edit Review Definition: Role Structure Review For Engineering Review Selection Select the roles to review (not used in role actions)

__ All roles 405

X Limit roles in this review to those which match all of the following conditions:

__ Roles of type role type list 415
             (none)
       X  Selected roles roles list 410
             Admin  Board Member  CEO  Developer  Program Mgr  QA Mgr  Subdoer  Tester __ Roles with the following attributes any roles 420

__ Roles that have entitlements in the following applications/directory/data-resource-set
             application list 425

__ Roles that have entitlements in the application/directory/data-resource-set with the
             following attributes None 430

__ Roles that belong to the following roleset role set list 435

__ Roles that have the following owners user list 440

__ Roles that have owners with the following attributes any users 445

< Back      Next>       Cancel       Help
```

| Return to Review Definition: Role Structure for Engineering |
| --- |
| Edit Review Definition: Role Structure Review For Engineering |

Actions and their Coverage

Select the reviewers

__ Role owners review their associated roles 510

__ Role backup owners review their associated roles 515

__ RoleSet Managers review their associated roles 520

__ triager 1     Review their associated roles 525

X Selected reviewers review all roles 505
      Select reviewers
      AveksaAdmin Reviewers Sign-Off __ Enable sign-off 540

Coverage File

__ Use a coverage file to determine the reviewers 530

Alternate Manager File

__ Alternate managers file for reviewers 535

Self Review Prevention

X   Do not allow reviewers to review their own entitlements 545

< Back    Next>    Cancel    Help

| Return to Review Definition: Role Structure for Engineering |
| --- |
| Edit Review Definition: Role Structure Review For Engineering |

Configuration

Delegation Info 605

___ Allow delegation capabilities to reviewers

___ Allow delegation capabilities to owners/monitors

Mark review items as reviewed when 610

X Review items are signed off

___ Review is marked as completed

Reminder email schedule 615

| | |
| --- | --- |
| Scheduled | ___ Yes    ___ No |
| Start | X Now ___ Review start date ___ Date 05/10/2011 00:49:32 |
| Frequency | ___ Daily X Weekly ___ Monthly ___ Quarterly ___ Semi-Annually ___ Annually ___ Once |
| End | X Never ___ Review Due Date ___ Date 05/10/2011 00:49:32 |

< Back     Next>     Cancel     Help

| Return to Review Definitions |
|---|

General 705    Results 715    Escalations 720    Email Events 725

Edit 710    Run Review 730    X

Home: Coarse Role Structure Review for Engineering    Generate Change Request: Automatically Description: This review is used to regularly check accuracy of the role definitions and structure for roles owned by the Engineering organization.

Is sign off enabled: No

Default state of review items: None:

Control of URL: http://mycorp.com/compliance/RSR-ENG-1

Review Instructions: When you are performing the review, you will see these instructions on screen Control Description: The description for the control goes here
Review Type: Role definition
Owner: AveksaAdmin
Available for
Rule Actions: Yes
Duration of
Reviews: 2 Weeks Default review state: Active Schedule Start Time: 5/10/11 12:45 AM
Frequency: Quarterly
Next Run Date: 8/10/11 12:45 AM Show History >

| |
|---|
| Home Users Resources Roles Requests Data Access Reviews Rules Reports Collectors Admin<br><br>Return to Review Results<br><br>Review Result: Fine-Grained Role Structure Review-1<br><br>General  Change Activity  History  Escalations 830<br>          820            825           Edit 810  Refresh Items 815  Update Un-Reviewed Items<br>                    Overall Status: 29%              8 Reviewed Roles<br><br>           Home: Fine-Grained Role Structure Review-1      Created On: 5/10/11 10:58 PM<br><br>      Description: This is a fine-grained review of all roles by AveksaAdmin<br><br>       Review Type: Role Definition            Generate Change Requests: Automatically<br><br>Review Definition: Fine-Grained Role Structure Review<br><br>           Owner: AveksaAdmin<br><br>     Review Status: Active    [Change] 805<br><br>                              Review Details<br>                              Assigned Items 835<br><br>Reviewed Items:     11%        45 Members and entitlements<br>Unassigned Items:   0 Roles<br><br>                              Review History<br>Search _____<br><br>Date Modified            Modified By          Comments<br><br>5/10/11 10:58 PM         AveksaAdmin          Review result created<br>5/10/11 10:58 PM         AveksaAdmin          The state of the review was changed for On Hold<br>                                              to Active<br>2 items |

| | | | | | |
|---|---|---|---|---|---|
| Return to Review Result: Fine-Grained Role Structure Review-1 | | | | | |
| Role Review: Fine-Grained Role Structure Review-1 | | | | | |
| All Roles By Reviewer | | | | | |
| Grouping -- select -- | | | | | |
| Search | | | | | |
| √ Last Name | | First Name | Reviewed Roles Summary | | |
| AveksaAdmin | | | 25% | | |

Grouping -- select --
    Search

| √ Actions | Status | Role Name | Members | Entitlements |
|---|---|---|---|---|
| Maintain Revoke | 100% | Admin | 2 | 1 |
| Maintain Revoke | 0% | Administrator | 2 | 1 |
| Maintain Revoke | 0% | Developer | 2 | 1 |
| Maintain Revoke | 85% | Program Manager | 2 | 1 |
| Maintain Revoke | 0% | QA Manager | 2 | 1 |
| Maintain Revoke | 0% | Subdoer | 2 | 1 |
| Maintain Revoke | 0% | Tester | 2 | 1 |
| Maintain Revoke | 100% | empty | 2 | 1 |

8 items 1 item

Unassigned Items
Unassigned Items: 0

OK   Cancel   Help

| Return to Overview |
|---|

Role Review: Coarse Role Structure Review for Engineering-1
1020
    Review Instructions: When you are performing a review you will see instructions on screen All Roles
                           Reviewed        8 roles
Grouping  -- select --

Search

√ Last Name         First Name
AveksaAdmin                     25%

Grouping    -- select --
    Search

| | | 1005 | | | |
|---|---|---|---|---|---|
| √ Actions | Status | Role Name | Members | Entitlements | State |
| Maintain Revoke | | Administrator | 0 | 0 | Committed |
| Maintain Revoke | | Board Member | 0 | 0 | Committed |
| Maintain Revoke | | CEO | 0 | 0 | Committed |
| Maintain Revoke | | Developer | 0 | 0 | Committed |
| Maintain Revoke | | Program Manager | 0 | 0 | Committed |
| Maintain Revoke | | QA Manager | 0 | 0 | Committed |
| Maintain Revoke | | Subdoer | 0 | 0 | Committed |
| Maintain Revoke | | Tester | 0 | 0 | Committed |
| 1010    1015 | | | | | |

8 items                                   1025
                                     OK    Cancel   Help

| |
|---|
| Return to Overview – Return to Role Review: Coarse Role Structure Review for Engineering-1 |
| Role Review: Coarse Role Structure Review for Engineering-Administrator |
|     Review Instructions: When you are performing a review you will see instructions on screen |
| General    Members    Entitlements    Analytics<br>1105         1110         1115            1120 |
| Edit 1125 |
|     Role Name: Administrator |
|     gr_date: ¾/08 12:38 AM |
|     gr_number: 1 |
|     gr_description: Administrator global role |
|     Tilayer 3: - - |
|     Tilayer 1: - - |
|     Tilayer 2: - - |
|     Last Review Date: - - |
|     Role Type: Global |
|     Owner: Nadimpalis, Sanjay |
|     Backup Owner: - - |
|     Role Collector: Bugzilla Roles |
|     State: Temporary |
|     Disabled: No |
|     Role Set: Role Set for RDC: Bugzilla Roles |
|     Hierarchy: Administrator |
|                                                        OK    Cancel    Help |

| Return to Overview – Return to Role Review: Coarse Role Structure Review for Engineering-1 |

Coarse Role Structure Review for Engineering-1:Administrator

Review Instructions: When you are performing a review you will see instructions on screen General       Members    Entitlements       Analytics Membership Role: All  Membership Role 1205
                             Show  X Directly entitled    __ All Grouping: - - select - -
Search: _____

| Actions | Member Type | Member Name | Direct Member of |
|---|---|---|---|
| Removed | user | Gorbash, Kathy | Administrator |
| Remove 1210 | user | Hiermath, Sameer | Administrator |

2 items

Refresh List       Add Members 1215

OK   Cancel   Help

| Return to Overview – Return to Role Review: Coarse Role Structure Review for Engineering-1 |
|---|

Coarse Role Structure Review for Engineering-1:Administrator

Review Instructions: When you are performing a review you will see instructions on screen General    Members    Entitlements    Analytics Entitlement Role: All Show: X Directly entitled    __ All Grouping: - - select - -
Search: _____

| Actions | Entitlement Type | Application/Directory/Data-Resource-Set Name | Entitlement Name | Direct Entitlement In |
|---|---|---|---|---|
| Remove 1305 | app-role | Alternate name for Bugzilla | Buzgilla Admin | Administrator |

1 item

Refresh List    Add Members 1310

OK    Cancel    Help

| | | | | |
|---|---|---|---|---|
| Return to Overview – Return to Role Review: Coarse Role Structure Review for Engineering-1 | | | | |
| Coarse Role Structure Review for Engineering-1:Administrator | | | | |
| Review Instructions: When you are performing a review you will see instructions on screen | | | | |
| General   Members   Entitlements   Analytics | | | | |
| Statistic | Value | Change | Target Difference | Role Quality |
| Role Quality | 4% | +1% | | 4% |
| No. of Users | 1 | 0 | -40 | |
| No. of Groups | 0 | 0 | | |
| No. of Entitlements | 1 | 0 | -30 | |
| No. of Sub-Roles | 0 | 0 | | |
| No. of Out of Constraint Users | 0 | 0 | | |
| No. of Missing Req. Entitlements | 0 | 0 | | |
| Separation of Duties | 0 | | | |
| Member users having violations | 0 | | | |
| Member growth rate (mem/wk) | 0.00 | | | |
| Member change rate (ch/wk) | 0.00 | | | |
| Role Change Rate (ch/wk) | 0.00 | | | |

Out of Constraint Users

Search: _____

| Last Name | First Name | Email | Remove |
|---|---|---|---|

0 items

Missing Required Entitlements

Grouping: - - select - -
Search: _____

Member Name  Email Address  Application/Directory/Data-Resource Set  Entitlement  Entitlement Type 0 items OK   Cancel   Help

| | | | | | |
|---|---|---|---|---|---|
Return to Overview

Role Review: Fine-Grained Role Structure Review-1

Review Instructions: When you are performing a review you will see instructions on screen All Roles Reviewed: 12%         8 roles 1525

Show: Not reviewed roles 7   Reviewed Roles: 1   All Roles: 8 1515

Grouping: - - select - -
Search: _____

| Actions | | Status | Role Name | Members | Entitlements |
|---|---|---|---|---|---|
| __ Maintain | Remove | 0% | Administrator | 2 | 1 |
| __ Maintain | Remove | 0% | Developer | 1 | 1 |
| __ Maintain | Remove | 17% | Program Mgr | 2 1510 | 4 |
| __ Maintain | Remove | 0% | QA Mgr | 3 | 2 |
| __ Maintain | Remove | 0% | Subdoer | 1 | 2 |
| __ Maintain | Remove | 0% | Tester | 2 | 1 |
| __ Maintain | Remove | | empty | 0 | 0 |
| 1520 | | | 1505 | | |

7 items

OK   Cancel   Help

Return to Overview

Role Review: Fine-Grained Role Structure Review-1:BU-QA 1615
0% progress on this role
Comments 1605
0 of 15 members reviewed
0 of 0 entitlements reviewed 1610 Review Instructions: Fine-grained reviews might require different instructions from coarse-grained reviews

| 1601 | 1602 | 1603 | 1604 |
|---|---|---|---|
| General | Members | Entitlements | Analytics |

Mark reviewed     Edit

Role Name: BU-QA
Long Description: This is a special role for users who are in QA Business Unit. It should hold any entitlements that are required of all members of the business unit that aren't directly related to a particular job.
gr_date: - -
gr_number: - -
Triager 3: - -
Triager 1: - -
Triager 2: - -
Last reviewed date: - -
Role Type: Business
Owner: AveksaAdmin
Backup Owner: - -
State: Temporary
Disabled: No
Role Set: Special
Hierarchy: BU-QA OK    Cancel    Help

```
Return to Overview
Fine-Grained Role Structure Review-1:BU-QA

Review Instructions: Fine-grained reviews might require    0% progress on this role
        different instructions from coarse-grained reviews          Comments
                                                                    15 of 15 members reviewed
                    1602                                            0 of 0 entitlements reviewed
General         Members       Entitlements   Analytics Membership Role: users, "Business Unit Id" = 2  Membership Role 1705
                        Show: X Directly entitled __ All
Grouping:   - - select - -
Search: _____

Action 1725   1730 Status  Member Type  Member Name   Direct Member of  Matches membership role
__ Maintain Remove         user         Nana, Paresh     BU-QA true        true
__ Maintain Remove         user         Nguyen, Tony     BU-QA true        true
__ Maintain Remove         user         Pant, Paver      BU-QA true        true
__ Maintain Remove         user         Peterson, Dan    BU-QA true        true
__ Maintain Remove         user         Pinto, Paul      BU-QA true        true
__ Maintain Remove         user         Polnicki, Adam   BU-QA true        true
__ Maintain Remove         user         Squires, Paul    BU-QA true        true
__ Maintain Remove         user         Taneja, Deepak   BU-QA true        true
__ Maintain Remove         user         Meno, Vishnu     BU-QA true        true
__ Maintain Remove         user         Welch, Patrick   BU-QA true        true
__ Maintain Remove         user         Zehme, Dan       BU-QA true        true
   1720    1710
15 items Refresh List         Add Members 1715

OK    Cancel    Help
```

```
Return to Overview
Fine-Grained Role Structure Review-1: Program Manager

Review Instructions:                          0% progress on this role
                                                      Comments
                                                      2 of 2 members reviewed
                            1603                      3 of 4 entitlements reviewed
General       Members     Entitlements  Analytics Entitlement Role: All
                        Show: X Directly entitled __ All
Grouping:  - - select - -
Search: _____

Action              Status  Entitlement Type  App/Dir/Data-Resource  Entitlement      Direct Entitlement In
                                              Set Name               Name
__ Maintain Remove          app-role          Bugzilla               Bug Triager      Program Manager
__ Maintain Remove          app-role          Bugzilla               Keywd Re         Program Manager
__ Maintain Remove          global-role       - -                    Developer        Program Manager
__ Maintain Remove          app-role          - -                    QA Mgr           Program Manager
            1805
4 items Refresh List        Add Members 1810

OK    Cancel   Help
```

| | | | | | |
|---|---|---|---|---|---|
| Return to Overview | | | | | |
| Fine-Grained Role Structure Review-1: BU-QA | | | | | |
| | | | | | |
| Review Instructions: | | | 94% progress on this role | | |
| | | | Comments | | |
| | | | 15 of 15 members reviewed | | |
| | | | 3 of 4 entitlements reviewed | | |
| General | Members | Entitlements | Analytics | | |
| | | | | | |
| | | | Target | | |
| Statistic | | Value | Change | Difference | Role Quality |
| Role Quality | | 0% | 0 | | 0% |
| No. of Users | | 15 | 0 | -35 | |
| No. of Groups | | 0 | 0 | | |
| No. of Entitlements | | 0 | 0 | -40 | |
| No. of Sub-Roles | | 0 | 0 | | |
| No. of Out of Constraint Users | | 0 | 0 | | |
| No. of Missing Req. Entitlements | | 0 | 0 | | |
| Separation of Duties | | 0 | | | |
| Member users having violations | | 0 | | | |
| Member growth rate (mem/wk) | | 0.00 | | | |
| Member change rate (ch/wk) | | 0.00 | | | |
| Role Change Rate (ch/wk) | | 0.00 | | | |
| | | | | | |
| | | Out of Constraint Users | | | |
| Search: _____ | | | | | |
| Last Name | First Name | Email | Remove | | |
| | | | | | |
| 0 items | | | | | |
| | | | | | |
| | | Missing Required Entitlements | | | |
| Grouping: - - select - - | | | | | |
| Search: _____ | | | | | |
| Member Name Email Address Application/Directory/Data-Resource Set Entitlement Entitlement Type | | | | | |
| | | | | | |
| 0 items | | | | | |
| | | | OK | Cancel | Help |

FIG. 19

SYSTEM AND METHOD FOR REVIEWING ROLE DEFINITIONS

CROSS-REFERENCE TO RELATED APPLICATIONS

This application claims priority to U.S. provisional application Ser. No. 61/512,173 entitled, "System and Method for Reviewing Roles", filed on Jul. 27, 2011, the entire contents of which are hereby incorporated by reference.

STATEMENT REGARDING FEDERALLY SPONSORED RESEARCH OR DEVELOPMENT

Not applicable.

REFERENCE TO A SEQUENCE LISTING, A TABLE, OR COMPUTER PROGRAM LISTING COMPACT DISC APPENDIX

Not applicable.

BACKGROUND OF THE INVENTION

The invention relates generally to access governance systems that use roles to grant access and entitlements to users, and more specifically to a system and method for reviewing the accuracy of role definitions.

In general, access governance systems define a user's access rights and entitlements. A role is an object that associates some number of people or identities with a common set of access rights or entitlements. Roles have become a common tool to simplify how people talk about access rights. For example, a user may have read/write access to a source control system, the ability to work on issues in a defect tracking system, and read/write access to the engineering folder on the corporate file share. If we define a role called "software engineer" and associate all of those entitlements with that role, we can simply say that person has "software engineer" access. Not only does that simplify the description of their access rights, but giving that role a descriptive name ("software engineer") provides business or functional context.

Roles present an opportunity to create a common and mutually understandable language of access between business and IT. When representatives from business and IT collaborate on the development of roles, they define a common vocabulary they can use to properly manage and govern user entitlements. The business users can associate users with these roles to provision or explain their entitlements based on their job function, location, or project assignments. Its view of a user's access becomes simpler to understand and more meaningful because their role aligns with how business users think about people within the organization. IT associates entitlements with these roles, making it easier to ensure that only appropriate access is granted.

Another important aspect of roles is that while a role has a collection of users and an associated collection of entitlements, this association really describes a user's authorized entitlements and not necessarily their actual ones. This notion of "authorized" versus "actual" entitlements is important for any roles lifecycle solution. Ideally the assignment of a role is tightly linked to the automatic provisioning of their authorized entitlements. But holding a role just authorizes the user to be granted those entitlements. Being assigned a role does not in and of itself mean a user has been granted the underlying entitlements, nor does it change how the underlying application authorizes an individual to use those entitlements.

There are two types of roles, business and technical, each designed to address different ways of simplifying the view of user access.

Business roles are aligned around a person's relationship to the organization, are most commonly associated with job titles or job codes and are often referred to as job roles. Similarly, project roles are business roles that are associated with various projects within the organization. Business roles may also be aligned with other criteria such as location, workflow or organization. The benefit of business roles is that they can be easily associated with employees based on their function or "role" within the organization. These business roles make it easy to enable access for new employees or to adjust existing employees' access as they change job functions or the work they are doing. Finally, aligning business roles with a person's functions and responsibilities simplifies and increases the accuracy of a manager identifying inappropriate access during entitlement reviews and granting new access as required.

Technical roles help abstract the implementation of business functions from the IT infrastructure. They allow the entitlements granted to a business role or a user to remain constant even when the underlying applications or technology that provide those capabilities changes. In addition, they hide the technical details of a function and refer to it in more readily understandable terms. For example, it is easy to understand the function named "purchase order approver" even if that technical role is associated with very technical entitlements not easily understood by business users. The existence of the role means those technical details can largely be ignored by the business user. Similarly, if the purchasing application or infrastructure changes, the details of the role can be changed without requiring the business to change its view of the user's entitlements.

As discussed above, the main purpose of roles is simplifying how we describe user access. This simplification is beneficial in many ways when it comes to access governance. First, entitlement reviews are simplified (and made more accurate) when there are fewer entitlements to review and those entitlements are easier to understand. If roles were not available, a reviewer would have to examine all of their users' granular entitlements, many of which would be described in technical, hard to understand terms. This would make it more difficult to determine if the entitlements are appropriate, raising the risk that a reviewer will leave an entitlement in place if they do not understand it, in fear that removing it would make it impossible for the person to do their job. Introducing roles into the process consolidates the entitlements required for their job functions into applicable roles, makes the review decision easier, and allows reviewers to focus on those entitlements not covered within roles.

One of the major causes of inappropriate access is people carrying entitlements from job to job as they move within a company. Access governance solutions can help automate the detection of such "movers". When used in combination with roles, this is a very effective means for ensuring that a user's access is adjusted as they move. Business roles, as opposed to technical roles, are useful because they are associated with the user's business context and often are directly associated with their specific function. As their functional responsibilities change, the access required for that function can be easily granted to them. Similarly, these same associations of roles to business context can be used to automatically grant appropriate access to people joining the company.

Another problem with existing access governance systems is that audits commonly find users who have conflicting access rights and entitlements. For example, an audit may find a finance clerk with access to both the accounts receivable and accounts payable modules of an enterprise resource planning (ERP) system. These entitlements would allow the clerk to single-handedly create and pay a purchase order, which violates segregation of duties policies. While it is very difficult and time consuming to detect such violations on a per-user basis, using a job role to define all the entitlements a user should have to perform his or her job makes it much easier to enforce proper segregation of duties. All that is required is checking roles against each other and making sure that each role contains no conflicting privileges. Users are less apt to have segregation of duties issues in this model as their roles should be aligned with their current job function.

Roles also make it much easier to provide users with new access rights. In addition to the access users should automatically be given based on their job function, organizations can also define project roles that describe the temporary access users may need for specific projects. When people need to be added to a project, they can simply be given the access rights defined by the appropriate project role. Without these roles, determining the access needed for a particular user joining a project can be error-prone and often inefficient, and the additional access is often not removed when they leave the project.

Technical roles help ensure the appropriate access is granted without having to understand the technical details of enabling that access. For example, requesting a technical role of "purchase order approver" is much more straightforward than having to understand the specific application entitlements, storage entitlements, etc. that a user may need to perform that simple function.

In much the same way roles help simplify how people request access, they help in the full lifecycle of access management. Approving access requests becomes simpler because in many ways the role defines a purpose or justification for the access being requested. Supervisors looking at their employees' access can more easily identify inappropriate access a user may have when it is organized into roles, as they may notice roles that no longer match a person's responsibilities.

For each of the benefits outlined above, the benefit can only be realized to the extent that the roles deployed in the system are accurate, i.e. to the extent that the roles have the correct members and contain the correct entitlements, where "correct" is with reference to the business purpose of the role, and where it is possible to easily determine that business purpose.

Reviews are only truly made simpler, for example, if the roles each user has are accurate, and meaningful to the reviewer, and the entitlements that being in those roles grants the user make sense for the business purpose of the role. For example, if a manager who is reviewing an employee who the manager know has thousands of entitlements, and only sees a dozen roles, the review will go much faster so long as the manager can trust that by approving the roles, the manager is approving the right set of entitlements "under the covers". If the manager cannot tell what a particular role is for or about by the name and/or description of the role, then the manager has to drill into it and start looking at individual entitlements. If the manager can tell what the role is supposed to be for, but the manager does not trust that it has the right contents, then the manager also has to start drilling into individual entitlements. As soon as a manager has to start drilling into the roles to see what entitlements are in them, the manager starts to lose the benefits of compressing the entitlement space into roles. The same is true for approvals, requesting access, and creating automated processes for movers, leavers, segregation of duties, etc.

Since all the benefits of roles are realized in proportion to the extent to which the definitions of the roles are accurate, and both meaningful and trusted by the users of those roles, what is needed then is a role review process to make sure that those role definitions accurate and meaningful, and to ensure that they stay that way, or even improve. Such a process would naturally foster user trust in the definitions.

SUMMARY OF THE INVENTION

The invention relates generally to a system and method for reviewing the accuracy of role definitions. The method includes storing a plurality of roles in a roles database. Each of the plurality of roles has an identifier and at least one associated entitlement. In one embodiment, the identifier is a name of the role. The method also includes storing a plurality of review definitions in a review definition database. Each review definition defines a role review process for at least one of the plurality of roles. To perform a role review, a processor executes a role review process defined by the review definition.

In one embodiment a system user creates the review definition. To create the review definition, the user selects which roles are to be included in the review, the reviewers to perform the review, and the schedule for executing the review. In one embodiment, to create the review definition, the user may select from predetermined review options. The user may select a single reviewer or may select a plurality of reviewers among with to distribute the review. In another embodiment, the user may select roles by selecting role names, role types, role attributes, role entitlements and/or role owners.

Once the review definition is created, the review may be executed. To execute the review, the processor notifies the selected reviewers of the pending review. In one embodiment, each time a role review is performed, an instance of the review is created. In various embodiments, the reviewers may select maintain a role, revoke a role, or modify any element of a role.

One objective of the invention is to have a system that uses the same primary process for ensuring role accuracy initially as it does to ensure the accuracy is maintained over time, that is by having the appropriate actors engage in a review of the definition of the roles. A second objective of the invention is to have a role review process that provides an opportunity to consider the business process of the role and whether or not it is accurately expressed in the name and description of the role. With this purpose in mind, the reviewer can then ensure that the set of users holding the role, and the set of entitlements that the role explains, are accurate. Another objective of the invention is to have a role review process that allows changes to be made to the role structure where inaccuracies are found.

Yet another objective of the invention is to have a role review process that may be distributed throughout the organization. Different actors within an organization will have the specific knowledge required to ascertain the accuracy of different elements of various roles, and the system according to the invention provides a way to identify these actors and bring their contributions into the process.

Finally, an overall objective of the invention is to have a review system and process that can be used initially to validate a roles model and can be used regularly over time to ensure that (1) the model changes to keep up with real changes in the organization, (2) inappropriate changes in the actual organization are corrected to align with the model, and (3) the quality of the model is improved, as refinements are noted at a granular level.

BRIEF DESCRIPTION OF THE DRAWINGS

The invention is pointed out with particularity in the appended claims. The above and further advantages of this invention may be better understood by referring to the following description taken in conjunction with the accompanying drawings, in which:

FIG. 3 is a pictorial view of a screenshot of one embodiment of the invention showing exemplary fields for creating a role review definition;

FIG. 4 is a pictorial view of a screenshot of one embodiment of the invention showing exemplary selections for defining which role(s) are included in the role review definition;

FIG. 5 is a pictorial view of a screenshot of one embodiment of the invention showing exemplary selections for the reviewers for a role review definition;

FIG. 6 is a pictorial view of a screenshot of one embodiment of the invention showing exemplary additional fields for a role review definition;

FIG. 7 is a pictorial view of a screenshot of one embodiment of the invention showing an example of a completed role review definition;

FIG. 8 is a pictorial view of a screenshot of one embodiment of the invention showing an example of a specific instance of a review in process;

FIG. 9 is a pictorial view of a screenshot of one embodiment of the invention showing an example of a results screen that is used by the review's owner to track the status of the review cycle;

FIG. 10 is a pictorial view of a screenshot of one embodiment of the invention showing an example screen displayed to a reviewer once the reviewer opts to perform a coarse-grained review;

FIG. 11 is a pictorial view of a screenshot of one embodiment of the invention of an example screen showing the general information of a role in a coarse-grained review;

FIG. 12 is a pictorial view of a screenshot of one embodiment of the invention showing the members of a role for a coarse-grained review;

FIG. 13 is a pictorial view of a screenshot of one embodiment of the invention showing the entitlements of a role for a coarse-grained review;

FIG. 14 is a pictorial view of a screenshot of one embodiment of the invention showing an example of an analytics screen for a coarse-grained review;

FIG. 15 is a pictorial view of a screenshot of one embodiment of the invention showing an example summary screen that is displayed to a reviewer having a set of fine-grained reviews to perform;

FIG. 16 is a pictorial view of a screenshot of one embodiment of the invention showing an example screen that is displayed to a reviewer when the reviewer selects to perform a fine-grained review;

FIG. 17 is a pictorial view of a screenshot of one embodiment of the invention showing the members of a role for a fine-grained review;

FIG. 18 is a pictorial view of a screenshot of one embodiment of the invention showing the entitlements of a role for a fine-grained review;

FIG. 19 is a pictorial view of a screenshot of one embodiment of the invention showing of an example of an analytics screen for a fine-grained review.

The attached drawings are intended to better illustrate the present invention without limiting it in any manner whatsoever. Like reference characters in the respective drawn figures indicate corresponding parts or steps.

DETAILED DESCRIPTION OF THE INVENTION

Figure 1:
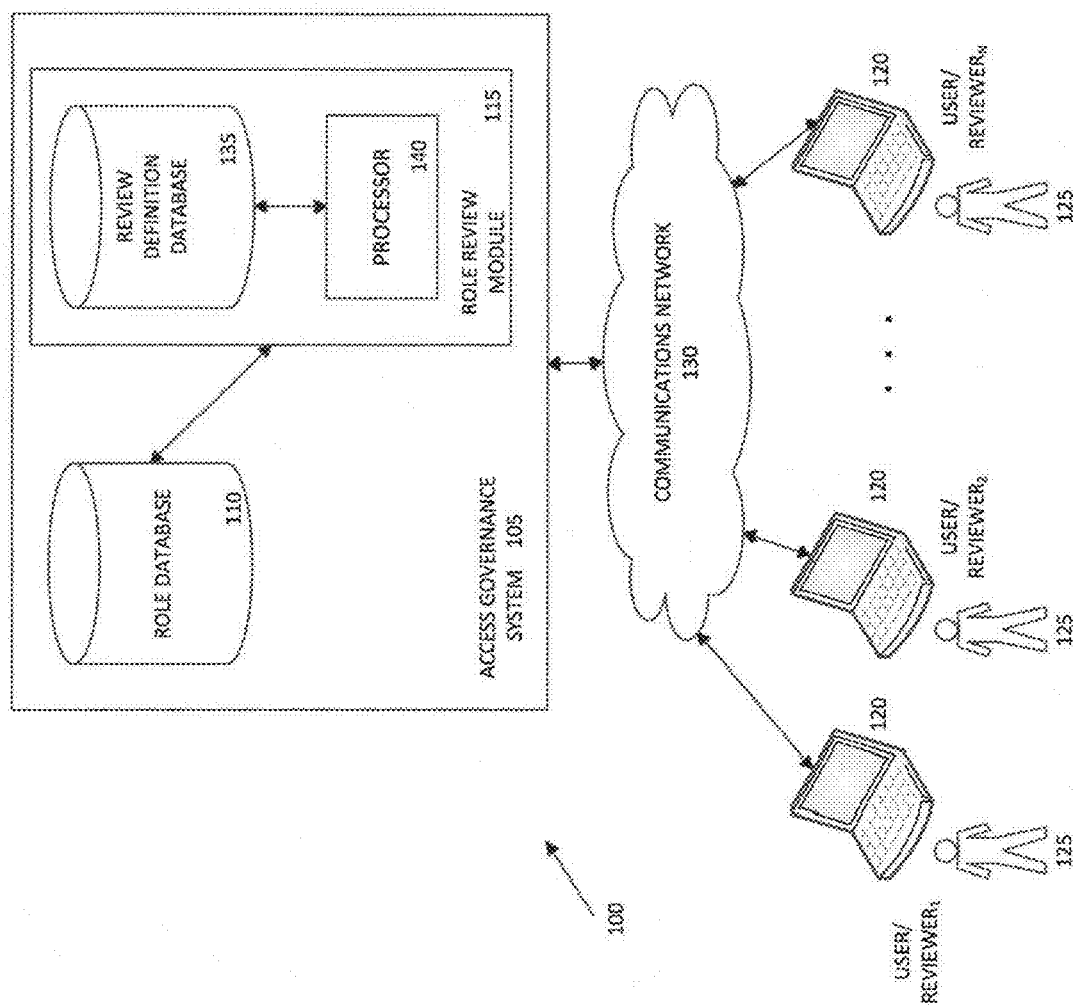
FIG. 1 is a block diagram of one embodiment of a system for reviewing role definitions.

Referring to FIG. 1 and in brief overview, an embodiment of a computer-implemented system 100 for reviewing role definitions is shown. The system 100 includes an access governance system 105 which includes a role database 110 and a role review module 115. The system 100 further includes a plurality of user/reviewer computers$_{1-N}$ 120 that are capable of communicating with the access governance system 105 via a communications network 130. A user/reviewer computer 120 may be any computer or terminal to which a user/reviewer 125 has access. The reviewer computer 120 may be a single computer, a plurality of computers, or any electronic device through which the reviewer 125 may access the access governance system 105.

The communications network 130 is any communications network that is capable of electronically connecting the review computers 120 with the access governance system 105. For example, the communications network may be the Internet, an intranet, VPN, wireless network or any other type of network that is able to provide communications between computers/electronic devices. In another embodiment, the reviewer computers 120 may communicate with the access governance system through different types of communications networks.

The access governance system 105 specifies the access rights of each user. In the embodiment shown, the access governance system 105 stores a plurality of roles in the role database 110. As described above, each role is an object that associates some number of people or identities with a common set of access rights or entitlements. The roles may be any of the types of roles described above in the Background of the Invention. In one embodiment, each of the plurality of roles is assigned a unique identifier. The identifier may be a name, number or any other method for uniquely identifying a role. The role database 110 stores the identifiers and the associated access rights or entitlements. Repeating an example from the Background of the Invention section, an identifier may be the name "software engineer" and the associated access rights and entitlements may be read/write access to a source control system, the ability to work on issues in a defect tracking system, and read/write access to the engineering folder on the corporate file share.

The role review module 115 includes a review definition database 135 and a processor 140. The review definition database 135 stores the review definitions which define the role review processes for each of the plurality of roles. The processor 140 executes the role review processes at the appropriate times as will be discussed in more detail below. In another embodiment, the role database 110 and the review definition database 135 are the same database. In another embodiment, the processor 140 is not dedicated to the role review module 115, but may be any processor that is part of the access governance system 105.

Figure 2:
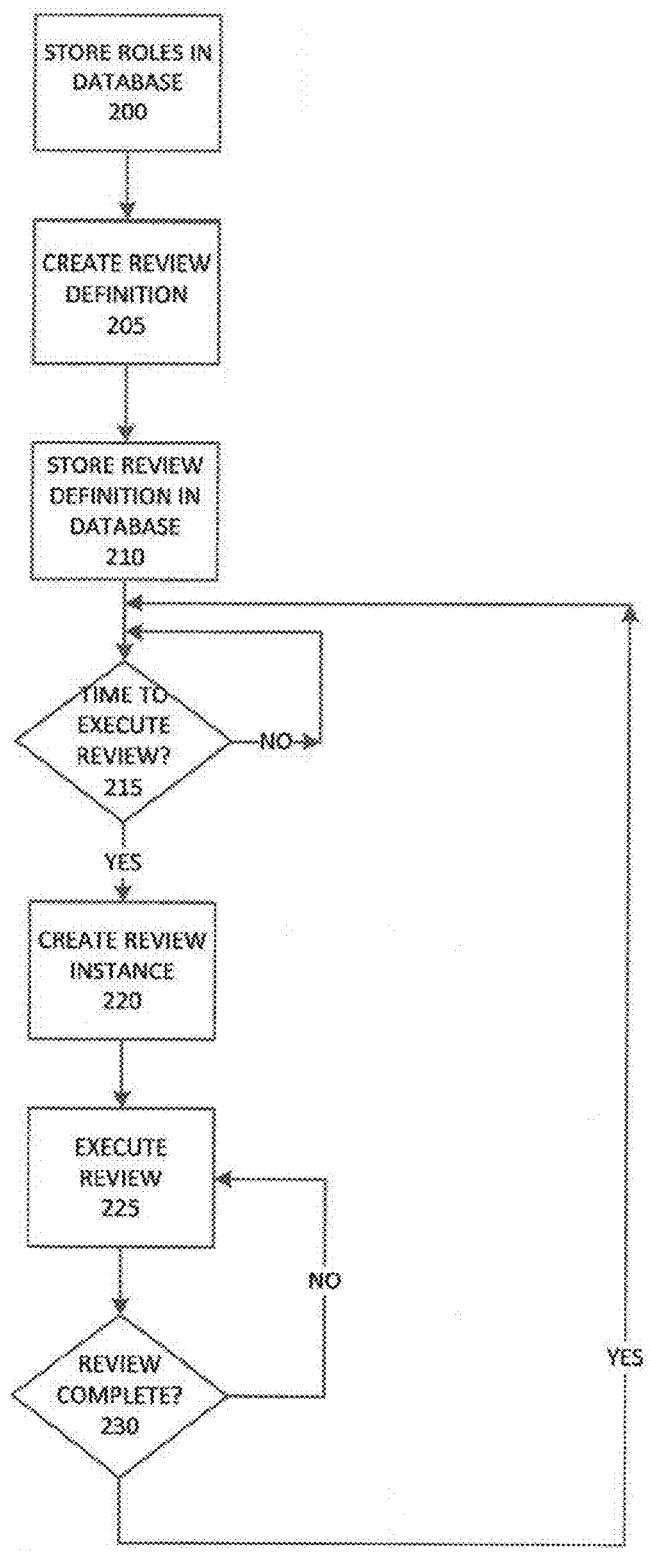
FIG. 2 is a flowchart representation of one embodiment of a process according to the invention for reviewing role definitions.

Referring now to FIG. 2 and in brief overview, an embodiment of a computer-implemented process for reviewing role definitions is shown. In step 200, the access governance system 105 stores the roles in the role database 110. In step 205, a user creates a review definition and in step 210 the access governance system 105 stores the review definition in the review definition database 135. Next, in step 215, the role review module 115 determines whether it is time to execute the review of the role according to the review definition. If it is not time to execute the review, the role review module 115 repeats step 215 until it is time to execute the review of the role. To execute the review, the role review module 115 first creates an instance of the review in step 220. Next, in step 225, the role review module 115 executes the review. In step 230, the role review module 115 determines if the review is complete. If the review is not complete, the role review module 115 continues performing steps 225 and 230 until the review is complete. When the review is complete, the role review module returns to step 215 until the next time the review is to be performed.

Techniques for creating roles are well known in the art and will not be described in detail here. The notion of reviewing access rights of individual users, one user at a time, also is well known in the art and will not be described in detail here. One of the primary focuses of the invention is defining a review process and using the review process to look at how roles are structured. This is different from reviewing access rights of individual users. A second goal of the invention is to define and use a distributed review process to look at how roles are structured.

Review Definition

After the roles are stored in the role database 110, the first step in performing a review of those roles according to the invention is to create review definitions (step 205 of FIG. 2). In this step, a user creates a review that determines what will be reviewed, by whom, on what schedule, with what level of detail, etc. In one embodiment of the invention, this is a configuration step with a large number of options, each of which will modify the behavior visible to the reviewers when the review is actually run. The creation of the review definition is a one-time process, although in some embodiments, the definition can be edited at any time if it is determined that some options should be changed. In one embodiment, a review definition can usually be simply explained in natural language. An example of a review definition may be: "a review process that involves having all roles in the 'Engineering Roles' role set to be reviewed by the associated role owners, in a fine-grained manner, once per quarter".

To create a role review definition, the user first navigates to the appropriate screen to create the role review definition. As described above in the discussion of FIG. 1, in one embodiment, the role review module 115 is part of a larger access governance system 105. In one such embodiment, the process for creating the definition of a role review is the same as that for all the other review definition types available. For example, an access governance system may have the ability to perform the following types of reviews: user access review, group definition review, account access and ownership review, data resource access review, and data resource definition and data resource definition and ownership review. In different embodiments, the appropriate screen may be selectable from a tab on the menu, from a drop down menu, from a set of options presented on a screen, or any other method known in the art for presenting selectable options in software.

Referring now to FIG. 3, a screenshot 300 of one embodiment of a software implementation for creating a role review definition is shown. In an embodiment in which there are several review types, the "Item Type to Review" field 301 identifies that this review definition is for a role review. In this screen, the user can fill in some metadata about this review definition. The user can enter a name or other identifier for the role review definition in the "Review Definition Name" field 305. In the example shown in FIG. 3, the user entered "Coarse Role Structure Review for Engineering" in the "Review Definition Name" field 305. In the "Description" field 310, the user may enter a brief description of the purpose of the review. Continuing the example shown in FIG. 3, the user explains that this review is for reviewing the accuracy of the roles in the engineering organization. The "Control URL" field 315 and the "Control Description" field 320 may be used to define any relationships of the role review definition to any formal controls. In the "Review Instructions" field 325, the user can define a block of instructions that will appear to the reviewers when they are performing the reviews.

In one embodiment, every role review definition has an owner, which can be selected in the "Owner" field 330.

The screen 300 also includes a block of information about how instances of this role review are run. The "Duration of Reviews" field 335 defines how long the reviews run. In the example shown in FIG. 3, the user has specified that the role review will run for two weeks. In the "Available for Rule Actions" field 340, the user may select whether or not the role review is available for rule actions. In the "Generate Change Request" field 345, the user may select whether or not changes from the review are generated automatically. If the changes are not to be generated automatically, in one embodiment, the changes have to be explicitly executed by the definition owner. In the "Default Review State" field 350, the user may specify whether instances default to starting "on hold" or in the "active" state.

In one embodiment, the invention includes an option for enabling reviews to run on an automatic schedule. In "Schedule" field 355, the user can define a schedule for automatically running the review. In other embodiments, reviews can be run on demand by a user, automatically, or both automatically and on demand.

Referring to FIG. 4, with the basic metadata defined, the next step is to identify which objects, in this case roles, are going to be reviewed. The user can select "all roles" option 405, or can use several different schemes to identify a targeted subset of roles. In the example shown in FIG. 4, an explicit list 410 has been chosen by the user, but other schemes may make more sense in large scale engagements. For example, a user may select to review roles of a particular type 415, roles that have particular attributes 420, roles that have entitlements in a specified set 425, roles that have entitlements that are part of a set with specified attributes 430, roles that are part of a particular role set 435, roles that have specified owners 440, or roles which have owners with certain defined characteristics 445. Other options are available in other embodiments. In general, the options are designed to cover a wide range of possible business logic.

Now that that user has defined what the review is about and which roles are being reviewed, in one embodiment, the user may have the option to define how the selected roles will be reviewed. In one such embodiment, the user may choose whether to do coarse or fine-grained review. In a coarse-grained review, the roles are reviewed at a high level either by maintaining or revoking the entire role. The details of the role may also be modified as part of the review. In a fine-grained review, the reviewers must review all the details of the role, i.e. general information, membership, entitlements, etc., to maintain a role. When reviewing details, the reviewers can edit role information and add/remove members and entitlements. In another embodiment of a fine-grained review, the reviewers can also revoke entire roles without reviewing the role details. The primary difference between coarse and fine-grained reviews is that fine-grained reviews require all members and entitlements to be individually reviewed, while coarse-grained reviews do not (although in one embodiment, the reviewers are allowed to make changes at the fine-grained level, if desired).

In yet another embodiment, there is a second set of options to filter down the set of objects to be reviewed even more, based on other business logic. A user can select to only include roles where some part of the role has not been reviewed (i.e. only review roles or role elements that have changed in some way since the last review), or roles that have active violations (i.e. only roles or role elements that are known to be incorrect). A user may also have the option to set a default state for reviewed items. This option is used to either require each item to be individually marked (if set to "none"), or to create a scenario where everything is assumed to be right unless explicitly changed (if set to "maintain").

The next step is to select the reviewers and which objects each reviewer is to review. FIG. 5 shows one example of screen 500 that presents options for selecting reviewers. There are several different ways to associate reviewers with reviews, and each role review definition can use one or more of the options. As shown in the example in FIG. 5, the user may select specific reviewers to perform the review using the "Selected reviewers review all roles" option 505. Other options to select reviewers include: role owners 510, role backup owners 515, and role set managers 520. In another embodiment, the user may use any custom field on the roles of the "User" type to determine a reviewer. This option supports cases where businesses associate users with roles as part of some specific business logic particular to that business. In the example shown in FIG. 5, the user has selected that the selected reviewers review all roles option 505. Another option in FIG. 5 is that the user may select users of the type "Triager 1" to review their associated roles. In other embodiments, more advanced cases can be resolved with a coverage file 530 or alternate managers file 535. The user may also enable the reviewers to sign off using field 540 and may prevent reviewers from reviewing their own entitlements using the "Self Review Prevention" field 545.

In one embodiment, in addition to defining reviewers, a role review definition allows the user to define monitors for the reviews. Monitors monitor the status of a review. Monitors may be defined using the same kinds of user-to-role mappings that are used to define reviewers. For example, the following options may be used to grant "monitor" access to the review: selected users over the entire review, role owners of the roles being reviewed, backup role owners of the roles being reviewed, role set managers of the roles being reviewed, user-type, and coverage files that determine the monitors. Similar to reviewers, monitors may be prevented from monitoring their own user entitlements.

The user may also select the display view to use for the review's summary windows. The options may include a default detail view of all roles, or the display may be customized by the user.

FIG. 6 presents additional configuration options to complete the role review definition. The "Delegation Info" field 605 enables users to select whether or not reviewers and owner/monitors are allowed to delegate their responsibilities within a review. In field 610, the user may specify when to mark items as reviewed. For example, a user may select to mark items as reviewed when the items are signed off, or when the review as a whole is completed. Finally, using the "Reminder emails schedule" field 615, the user may specify whether or not reminder emails to be sent to reviewers and/or monitors are scheduled and at what frequency.

FIG. 7 shows an example of a completed role review definition. The screen 700 includes a General tab 705 with information about the definition, an Edit button 710 that allows a user to alter any of the settings the user just configured, and a series of other tabs. When selected, the Results tab 715 shows information about the different "runs" of this particular role review definition. The Escalations tab 720 shows any escalations arising from reviews based on this definition. The Email Events tab 725 tracks events generated from reviews based on this definition. Administrators may trigger explicit review instantiation for reviews not on a schedule, or for ad hoc additional review cycles, via the "Run Review" button 730.

Performing the Reviews

Once the role review definition has been created, the next step is to execute the review either automatically on a schedule or manually via explicit administrator action. The role review process defined by the previously created role review definition is thereby "run". Effectively, this involves creating an instance of the kind of review that the definition describes, and putting it into effect. A definition may have a large number of such instances associated with it over time—for example, the quarterly review of Engineering roles described above will be run four times a year, since it is on a quarterly schedule. Each of these "runs" amounts to using the invention to track and complete a review according to a specific role review definition.

Managing Review Instances

In one embodiment, the role review module 115 stores each instance of a review that is performed. In one embodiment, the role review module 115 includes an option to display all review instances, their current state (Active/On Hold/Complete) and their completion status. Selecting a particular review instance (i.e. by clicking on a name) drills into that review run for additional details.

FIG. 8 shows an example screen 800 of a specific instance of a review in process. The user can control the state (Review State field 805), edit the details of this instance using the Edit button 810, refresh and update the contents of the review using the Refresh Items button 815, or drill into details of which reviewers have completed how much of their assigned work. In the example shown, the screen 800 also displays (1) lists of changes made during this review run when the Change Activity tab 820 is selected, (2) a detailed history of this run when the History tab 825 is selected, and (3) a list of escalations associated with this review instance when the Escalations tab 830 is selected. The screen 800 may also display the details from the "Assigned Items" by selecting button 835.

FIG. 9 shows an example of a results screen 900 that is used by the review's owner to track the status of the review cycle, see who is failing to do their reviews, and eventually to close the review (and possibly to explicit push out changes from the review). The review owner is the person(s) responsible for the review.

While the creation and maintenance of review definitions is a fairly rare operation, that typically involves a very small number of highly knowledgeable users of the access management system 105, the actual use of these definitions to drive a review cycle involves a much larger set of users (everyone who operates as a reviewer or monitor, or anyone delegated to by those people).

When a review cycle is started (either by the system on a schedule, or by an administrator explicitly), these persons to be involved in the review will be made aware of the review by the role review module 115. In one embodiment, the access management system 105 maintains a task list for each potential review participant. In one such embodiment, the review participants are made aware of their participation in a pending review when the review appears as a work item on their task list. Participants may have both coarse- and fine-grained role structure reviews pending. In other embodiments, the system may send an email to the reviewers and/or monitors notifying them of the review FIG. 10 is an example screen 1000 displayed to a reviewer once the reviewer opts to perform a coarse-grained review. This screen 1000 shows the list of role names 1005 that this reviewer is responsible for reviewing, along with Maintain 1010 and Revoke 1015 buttons for each one. In the example shown, "Maintain" means keep the role and "Revoke" means all users from membership and delete the role. In one embodiment, the table shown in the screen 1000 has standard table capabilities such as click to sort columns, drag to rearrange columns, search/grouping, paging, column selection and option buttons, etc. and also has the standard additional buttons at the bottom for review lists. In another embodiment, the screen 1000 also has a collapsible ribbon 1020 at the top showing the reviewer instructions that were entered into the review definition.

Some reviewers will be able to complete their review simply by using the Maintain 1010 and Revoke 1015 buttons on this page. Other reviewers will need to click on some of the Role Names 1005 to see more detailed information about the roles and possibly to alter them. In general, the reviewer will stay on this screen 1000 until the reviewer has marked each role as Maintain or Revoke, possibly drilling into more detailed information on some or all roles, and possibly making some changes in some or all roles. Once the reviewer has resolved each role somehow, the reviewer may select the "OK" button 1025, thereby completing their work. In one embodiment, if the reviewer needs to stop the reviews before completion, the role review module 115 will remember which roles have already been resolved and how the roles were resolved, so that the reviewer can resume the reviews at a later time.

FIG. 11 shows an example screen 1100 that is displayed to a reviewer when the reviewer selects to review a role name 1005 having an associated coarse-grained review definition. In the embodiment shown, the screen 1100 includes four tabs that the reviewer may select: general 1105, members 1110, entitlements 1115 and analytics 1120. When selected, the general tab 1105 displays general information about the role and an edit button 1125 to trigger editing of any of the information to be changed.

By selecting the members tab 1110, the reviewer is shown a detailed list of the current membership of the role. As shown in the example screen 1200 of FIG. 12, similar to the general tab 1105, the reviewer has a button 1205 for editing the rule that defines the membership of the role. In other embodiments, the reviewer has options to see those people directly entitled to the role, or the list of everyone who is entitled to the role via direct or indirect means. Each current (direct) member has a "removal" action button 1210 that may be selected by the reviewer if the reviewer deems that the member should not be a member of the role. It is also possible for the reviewer to add members as part of the review's changes, if desired, by using an "add members" function 1215. Selecting the "add members" function 1215 brings up a dialog for adding members, with suggested additions (if the system 105 has any), matching members (if there is a membership rule and there are any users matching it who are not already members), and all users/groups options.

In one embodiment, all the changes made to a role during the review are kept as "proposed" changes to the current role until the review is complete or the role changes are explicitly committed outside of the review. If a reviewer looks into details of a role under review more than once, or if other reviewers have made changes as part of this review, the reviewer will see those changes.

Referring now to FIG. 13, analogous to the members screen 1200, an exemplary entitlements screen 1300 displays the list of entitlements, enables a reviewer to remove any entitlements that do not belong using the "Remove" buttons 1305, and enables the reviewer to add entitlements using the Add Entitlements button 1310 (including the ability to see any suggested additions, or entitlements that match the entitlement rule, etc.).

Referring now to FIG. 14, an example of an embodiment of an analytics screen 1400 is shown. The analytics screen 1400 displays metrics about the role and some additional tables of information that may be particularly useful for review, such as lists of users who are members but do not match the membership rule, and lists of users who do not actually have all the entitlements that the role authorizes (and details of which ones they are missing.). This information may be helpful to a user in deciding what changes to make in the review.

FIG. 15 shows an example summary screen 1500 that is displayed to a reviewer having a set of fine-grained reviews to perform. With a fine-grained review, in one embodiment, when a reviewer performs the review, the display is somewhat different. The screen 1500 may still display a list of roles that need to be marked as "maintain" or "revoke", and revoke may still mean essentially delete the role, but in one such embodiment "maintain" is now the doorway to a process that requires the role metadata, and each role member and entitlement, to be explicitly maintained or revoked individually. In one such embodiment, the screen 1500 can be set to show only those roles not yet completely reviewed, only those that have been completely reviewed, or all roles regardless of their review state. The example screen 1500 shown in FIG. 15, displays the list of roles 1505 not completely reviewed, of which there are seven. One of the roles, "Program Manager" 1510 has been partially reviewed already. From reviewing the "show" field 1515, the reviewer can also tell that there is one role that was completely reviewed, and which is therefore not shown.

Selecting the "Maintain" function 1520 for one of these roles takes the reviewer into the process of a detailed review. FIG. 16 shows the first screen 1600 displayed to a reviewer in one embodiment of a fine-grained role review. Similar to the coarse-grained review, in the embodiment shown for a fine-grained review, the screen 1600 includes four tabs that the reviewer may select: general 1601, members 1602, entitlements 1603 and analytics 1604. When selected, the general tab 1601 displays general information about the role, which the reviewer can either edit 1606 or mark as having been reviewed 1607. The reviewer can add comments to the record by clicking on the comment icon 1605. In the embodiment shown, the screen 1600 displays both the instructions 1610 defined earlier and a set of running progress bars 1615 showing what portion of members and entitlements have already been handled in this review.

By selecting the members tab 1602, the reviewer is shown a detailed list of the current membership of the role. As shown in the example screen 1700 of FIG. 17, similar to the general tab 1601, the reviewer has a button 1705 for editing the rule that defines the membership of the role. In other embodiments, the reviewer has options to see those people directly entitled to the role, or the list of everyone who is entitled to the role via direct or indirect means. Each current (direct) member has a "removal" action button 1710 that may be selected by the reviewer if the reviewer deems that the member should not be a member of the role. In one embodiment, the display 1700 can be toggled to show direct members (who must be reviewed) and all members (with indirect members not requiring Maintain/Revoke decisions). In other embodiments, it is also possible for the reviewer to add members as part of the review's changes, if desired, by using an "add members" function 1715. Selecting the "add members" function 1715 brings up a dialog for adding members, with suggested additions (if the system 105 has any), matching members (if there is a membership rule and there are any users matching it who are not already members), and all users/groups options.

As can be seen in the example screen 1700 of FIG. 17, the members tab 1602 also acts similarly to the coarse-grained case, except for the addition of the Maintain button 1720 in the Action column 1725. Each membership has to be explicitly marked as maintain or revoke in order to complete the review. As with any review, the timer icon 1730 can be used to set expiration on the certification, in this case on the certification of a particular membership within the role.

Referring now to FIG. 18, analogous to the members screen 1700, an exemplary entitlements screen 1800 displays the list of entitlements, enables a reviewer to remove any entitlements that do not belong using the "Remove" buttons 1805, and enables the reviewer to add entitlements using the Add Entitlements button 1810 (including the ability to see any suggested additions, or entitlements that match the entitlement rule, etc.). The entitlements tab 1603 follows the same pattern as the members tab 1602, with each entitlement requiring an individual Maintain or Revoke decision, and with the results of each being reflected in the progress bars 1815.

Referring now to FIG. 19, an example of an embodiment of an analytics screen 1900 for a fine-grained review is shown. The analytics screen 1900 displays metrics about the role and some additional tables of information that may be particularly useful for review, such as lists of users who are members but do not match the membership rule, and lists of users who do not actually have all the entitlements that the role authorizes (and details of which ones they are missing.). This information may be helpful to a reviewer in deciding what changes to make in the review.

Referring again to FIG. 15, as each role's fine-grained review is completed, the overall progress of the review is updated in the top progress bar 1525, and the completed role disappears from the "Not reviewed roles" view. In the "All Roles" view, the reviewer/monitor can see the state of all roles, and have the ability to access the history of each completed review. Similar to the coarse-grained reviews, while reviewers can leave the review at any time, their "incomplete" work will remain on their task list until their reviewing is complete.

In one embodiment, reviews where the reviewer has completed his or her work will also remain on the list at 100% complete until the review is closed.

The techniques described above can be implemented in digital electronic circuitry, or in computer hardware, firmware, software executing on a computer, or in combinations of them. The techniques can be implemented as a computer program product, i.e., a computer program tangibly embodied in tangible, machine-readable storage medium, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions described herein by operating on input data and generating output. Method steps can also be performed by, and apparatus of the invention can be implemented as, special purpose logic circuitry, e.g., an FPGA (field programmable gate array) or an ASIC (application-specific integrated circuit). Applications can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Storage media suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A computing system implementing the invention can include clients and servers. A client and server are generally remote from each other and typically interact over a communication network. The relationship of client and server arises by virtue of computer programs running on the respective computers and having a client-server relationship to each other.

Having described various embodiments of the invention, it will now become apparent to one of skill in the art that other embodiments incorporating the concepts may be used. It is felt, therefore, that these embodiments should not be limited to the disclosed embodiments, but rather should be limited only by the spirit and scope of the following claims.

What is claimed is:

1. A system for reviewing role definitions, comprising:
   a first database storing a plurality of roles, each of the plurality of roles having an identifier and at least one associated entitlement, each of the plurality of roles representing an object that associates some number of people or identities with a common set of access rights or entitlements;
   a second database storing a review definition, the review definition defining a role review process for at least one of the plurality of roles, the role review process ensuring that role definitions are accurate and meaningful over a period of time and enabling changes to be made to a role structure where inaccuracies are found; and
   a processor in communication with the first and second databases, the processor executing instructions to execute the role review process defined by the review definition;
   wherein a meaningful role definition of a role within an organization is one in which the role definition aligns with actual business roles of people within an organization;
   wherein the review definition stored in the second database includes:
   i) a schedule defining when a review process for a role is to be run,
   ii) a review duration defining how long the review process runs,
   iii) an identifier of a review owner identifying a person authorized by the system to select at least one reviewer to perform the role review process, and
   iv) an indicator indicating whether the review process is to be coarse-grained or fine-grained, a coarse-grained review being a review of a role at a high level either by maintaining or revoking the role, a fine-grained review being a review of details of the role including membership and entitlements; and
   wherein the processor, prior to storing the review definition, further executes instructions to receive, at the direction of the review owner, by a graphical user interface (GUI) generated by the processor and displayed on a display device coupled to the processor, a selection of at least one reviewer to perform a role review specified by the role review process,
   wherein the processor further executes instructions to present the user with controls for receiving from the user a reviewer delegation indication indicating whether the at least one reviewer may delegate performing the role review process to another person, wherein the controls include a checkbox configured to provide the processor with (i) a first value in response to the user clicking the checkbox to indicate that the at least one reviewer is allowed to delegate performing the role review process to another person and (ii) a second value in response to the user clicking the checkbox to indicate that the at least one reviewer is not allowed to delegate performing the role review process to another person,
   wherein the processor further executes instructions to store the reviewer delegation indication and
   to allow the at least one reviewer to delegate, or prevent the at least one reviewer from delegating, performing of the role review process to another person based on whether the checkbox respectively provides the processor with the first value or the second value,
   wherein a reviewer has a role within the organization defined by a role definition associating a group of people with access rights to resources,
   wherein the processor further executes instructions to present the user with controls for receiving a self-review prevention indicator indicating whether to prevent the at least one reviewer from performing a self review of access rights to the resources, wherein the controls include another checkbox configured to provide the processor with (i) a first self-review value in response to the user clicking the other checkbox to indicate that the at least one reviewer is allowed to perform a self review of access rights to the resources and (ii) a second self-review value in response to the user clicking the other checkbox to indicate that the at least one reviewer is not allowed to perform a self review of access rights to the resources,
   wherein the processor further executes instructions to store the self-review prevention indicator and
   to allow the at least one reviewer to perform, or prevent the at least one reviewer from performing, a self review of access rights to the resources based on whether the other checkbox respectively provides the processor with the first self-review value or second self-review value.

2. The system of claim 1 wherein the second database stores a plurality of review definitions, each of the plurality of review definitions defining a role review process for a corresponding one of the plurality of roles.

3. The system of claim 1 wherein the processor further executes instructions to create the review definition by receiving information from a user.

4. The system of claim 3, wherein the processor further executes instructions to utilize a user selection of at least one of the plurality of roles for the role review process to create the review definition.

5. The system of claim 4, wherein the user selection may be selected from the group consisting of: role type, role name, role attributes, role entitlements, role members and role owners.

6. The system of claim 3, wherein the processor further executes instructions to utilize a user selection of a schedule for the review to create the review definition.

7. The system of claim 1, wherein the processor further executes instructions to create a first instance of the role review process while executing the review process.

8. The system of claim 1, wherein the processor further executes instructions to create an instance of the role review process each time the processor executes the role review process.

9. The system of claim 1, wherein the processor further executes instructions to notify the at least one selected reviewer of the role review process.

10. The system of claim 1, wherein the processor further executes instructions to modify the at least one of the plurality of roles in response to receiving a user instruction to modify the at least one of the plurality of roles.

11. A method for reviewing role definitions in a role review system, comprising the steps of:
    storing a plurality of roles in a first database, each of the plurality of roles having an identifier and at least one associated entitlement, each of the plurality of roles representing an object that associates some number of people or identities with a common set of access rights or entitlements; and
    storing a review definition in a second database, the review definition defining a role review process for at least one of the plurality of roles, the role review process specifying role reviews arranged to verify that role definitions are accurate and meaningful over a period of time and enabling changes to be made to a role structure where inaccuracies are found;

wherein a meaningful role definition of a role within an organization is one in which the role definition aligns with actual business roles of people within an organization;

wherein storing the review definition in the second database includes storing i) a schedule defining when a review process for a role is to be run, ii) a review duration defining how long the review process runs, iii) an identifier of a review owner identifying a authorized by the system to select at least one reviewer to perform the role review process, and iv) an indicator indicating whether the review process is to be coarse-grained or fine-grained, a coarse-grained review being a review of a role at a high level either by maintaining or revoking the role, a fine-grained review being a review of details of the role including membership and entitlements, wherein the method further comprises, prior to storing the review definition, receiving, at the direction of the review owner, by a graphical user interface (GUI) generated by a processor of the role review system and displayed on a display device coupled to the processor, a selection of at least one reviewer to perform a role review specified by the role review process, wherein generating the GUI includes presenting the user with controls for receiving from the user a reviewer delegation indication indicating whether the at least one reviewer may delegate performing the role review process to another person, wherein the controls include a checkbox configured to provide the processor with (i) a first value in response to the user clicking the checkbox to indicate that the at least one reviewer is allowed to delegate performing the role review process to another person and (ii) a second value in response to the user clicking the checkbox to indicate that the at least one reviewer is not allowed to delegate performing the role review process to another person, wherein storing the review definition in the set of databases further includes storing the reviewer delegation indication, and wherein the method further comprises executing the role review process, wherein executing includes allowing the at least one reviewer to delegate, or preventing the at least one reviewer from delegating, performing of the role review process to another person based on whether the checkbox respectively provides the processor with the first value or the second value, wherein a reviewer has a role within the organization defined by a role definition associating a group of people with access rights to resources, wherein generating the GUI further includes presenting the user with controls for receiving a self-review prevention indicator indicating whether to prevent the at least one reviewer from performing a self review of access rights to the resources, wherein the controls include another checkbox configured to provide the processor with (i) a first self-review value in response to the user clicking the other checkbox to indicate that the at least one reviewer is allowed to perform a self review of access rights to the resources and (ii) a second self-review value in response to the user clicking the other checkbox to indicate that the at least one reviewer is not allowed to perform a self review of access rights to the resources, wherein storing the review definition in the set of databases includes storing the self-review prevention indicator, and wherein executing the role review process defined by the inputs further includes allowing the at least one reviewer to perform, or preventing the at least one reviewer from performing, a self review of access rights to the resources based on whether the other checkbox respectively provides the processor with the first self-review value or the second self-review value.

12. The method of claim 11 further comprising the step of storing a plurality of review definitions in the second database, each of the plurality of review definitions defining a role review process for one of the plurality of roles.

13. The method of claim 11, wherein creating the review definition further comprises the processor receiving a selection from predetermined review options.

14. The method of claim 11, wherein the step of creating the review definition comprises the processor receiving a selection of at least one of the plurality of roles for the role review process.

15. The method of claim 14, wherein the selection may be selected from the group consisting of: role type, role name, role attributes, role entitlements, role members and role owners.

16. The method of claim 11, wherein the step of creating the review definition further comprises the processor receiving a schedule for the review.

17. The method of claim 11, wherein the step of creating the review definition further comprises the processor receiving a plurality of reviewers among which to distribute the review.

18. The method of claim 11, wherein the step of executing the review process further comprises creating a first instance of the review process.

19. The method of claim 11, further comprising the step of executing the review a plurality of times, wherein an instance of the role review process is created by the processor for each execution.

20. The method of claim 11, wherein the step of executing the review process further comprises notifying the at least one selected reviewer of the role review process.

21. The method of claim 11, further comprising the step of receiving, by the processor, an instruction from a user regarding the at least one of the plurality of roles.

22. The method of claim 21 wherein the instruction is to maintain the at least one of the plurality of roles.

23. The method of claim 11, wherein the processor utilizes a user selection of a plurality of reviewers among which to distribute the role review process to create the review definition.

24. The method of claim 11 wherein the at least one reviewer is an associated role owner.

25. The method of claim 11,
wherein the method further comprises changing a role definition when the role definition is found to be inaccurate.

26. The method of claim 25, wherein each of the plurality of roles has a set of members, each of the set of members being a person or identity that matches a membership rule for that role;
wherein the method further comprises defining a metric for a role of the plurality of roles, the metric being based upon i) a list of people who are members of the role but do not satisfy the criteria determined by the membership rule for that role, and ii) a list of people who are not members of the role but satisfy the criteria determined by the membership rule for that role.

* * * * *